United States Patent [19]
Girard et al.

[11] Patent Number: 5,316,240
[45] Date of Patent: May 31, 1994

[54] METHOD AND DEVICE FOR FILTERING THE VIBRATORY EXCITATIONS TRANSMITTED BETWEEN TWO PARTS ESPECIALLY BETWEEN THE ROTOR AND THE FUSELAGE OF A HELICOPTER

[75] Inventors: Laurent Girard; Tomasz Krysinski, both of Marseille; Pierre Michel, Aix-en-Provence, all of France

[73] Assignee: Aerospatiale Societe Nationale Industrielle, Paris, France

[21] Appl. No.: 928,306

[22] Filed: Aug. 12, 1992

[30] Foreign Application Priority Data

Sep. 28, 1991 [FR] France ................ 91 10722

[51] Int. Cl.⁵ ................ B64C 27/51; F16F 7/00
[52] U.S. Cl. ................ 244/17.27; 188/380; 248/550
[58] Field of Search ........... 244/17.13, 17.27; 188/379, 380; 248/550

[56] References Cited

U.S. PATENT DOCUMENTS

| | | | |
|---|---|---|---|
| 3,477,665 | 11/1969 | Legrand | 244/17.27 |
| 3,483,951 | 12/1969 | Bonesho et al. | 188/379 |
| 3,520,498 | 7/1970 | Murphy | 244/17.27 |
| 3,701,499 | 10/1972 | Schubert et al. | 244/17.27 |
| 3,807,678 | 4/1974 | Karnopp et al. | 248/358 R |
| 4,834,318 | 5/1988 | Murphy | 244/17.27 |
| 3,945,256 | 3/1976 | Wilson et al. | 244/17.27 |
| 3,954,229 | 5/1976 | Wilson | 244/17.27 |
| 4,213,518 | 7/1980 | von Hardenberg et al. | 188/380 |
| 4,360,087 | 11/1982 | Curwen | 188/379 |
| 4,405,101 | 9/1983 | Carlson et al. | 188/380 |
| 4,638,983 | 1/1987 | Idigkeit et al. | 244/17.27 |
| 4,834,318 | 5/1984 | Taylor et al. | 244/17.13 |
| 4,887,699 | 12/1989 | Ivers et al. | 244/550 |
| 4,937,758 | 6/1990 | Hayden et al. | 244/17.11 |
| 4,958,786 | 9/1990 | Ogawa et al. | 244/17.13 |
| 5,008,606 | 4/1991 | Koehler et al. | 244/17.27 |
| 5,092,800 | 3/1992 | Hirt | 248/550 |
| 5,121,898 | 6/1992 | Yasuda et al. | 248/550 |
| 5,133,527 | 7/1992 | Chen et al. | 248/550 |

FOREIGN PATENT DOCUMENTS

| | | |
|---|---|---|
| 1506385 | 11/1967 | France . |
| 1507306 | 12/1967 | France . |
| 2200457 | 4/1974 | France . |
| 2499505 | 8/1982 | France . |
| 2566862 | 1/1986 | France . |
| 2629545 | 10/1989 | France . |
| 2642493 | 8/1990 | France . |
| 601492 | 4/1978 | U.S.S.R. ................ 188/379 |
| 2228551 | 8/1990 | United Kingdom . |

*Primary Examiner*—Michael S. Huppert
*Assistant Examiner*—Virna Lissi Ansley
*Attorney, Agent, or Firm*—Fisher, Christen & Sabol

[57] ABSTRACT

The present invention relates to a device for elastic linking between two parts (3, 5) in order to filter the vibratory excitations which are transmitted from one to the other, comprising:
- at least one linking element (7) between said parts (3, 5) comprising a transmission member (8) for the static force between said parts (3, 5), and an actuator (9) associated with said transmission member (8),
- at least one means of measurement (10) of a physical quantity which is representative of said vibratory excitations, and able to supply corresponding first signals, and
- electronic processing means (12) for said first signals in order to convert them into second control signals for said actuator (9).

According to the invention, said measurement means (10) is mounted on said linking element (7).

21 Claims, 3 Drawing Sheets

METHOD AND DEVICE FOR FILTERING THE VIBRATORY EXCITATIONS TRANSMITTED BETWEEN TWO PARTS ESPECIALLY BETWEEN THE ROTOR AND THE FUSELAGE OF A HELICOPTER

BACKGROUND OF THE INVENTION

1. Field of the Invention

The present invention relates to a method for filtering the vibratory excitations transmitted between two parts and an elastic linking device between two parts which transmits the static forces from one to the other in the axis of the device and for simultaneously filtering the associated coaxial vibratory excitations which are transmitted from one to the other.

More particularly, although not exclusively, such a device can be used in the suspension linking the main transmission gearbox to the fuselage of an aircraft with rotating wings, such as a helicopter, in order to filter the vibrations generated by the rotor and transmitted to the fuselage of said aircraft by said transmission gearbox.

2. Background Art

In fact, one of the fundamental problems of the helicopter arises from the general vibratory level which conditions, on the one hand, the level of the alternating stresses throughout the machine (and consequently the fatigue behavior and hence the lifetime of the parts) and, on the other hand, the cabin comfort and control vibrations.

The object of much research has therefore been to attenuate, if not to completely cancel out, this vibratory level inherent in the very operation of the rotor which not only transmits to the hub static or quasistatic forces and moments created by:

- the lift (perpendicular to the plane of the rotor),
- the drag (in the plane of the rotor and parallel to the component $V_H$, normal to the rotor mast, of the forward speed of the aircraft),
- the drift force (perpendicular to the preceding two and also in the plane of the rotor) which remains small and which can generally be ignored, but also periodic forces and moments originating from aerodynamic dissymetries (lift and profile drag) which appear during the rotation of the blades, essentially due to the forward speed in flight of translation at high speed, or also dissymetries resulting from the inequality of distribution of the speeds induced on the disk of the rotor at low speed (transition area). These alternate aerodynamic forces and moments are transmitted to the center of the rotor after having been attenuated or amplified by the blades.

Given that, in a general way, by $\Omega$ the speed of rotation of the rotor is expressed in number of revolutions per second and by b represents the number of blades, note that:

- the forces (due to the flapping movements of the blades) and the moments (due to the drag movements of the blades) whose axes are carried by the axis of the rotor, are transmitted to the mast and to the fuselage only if their frequency expressed in hertz (Hz) is a harmonic of $b\Omega$, and thus of the form $kb\Omega$ (k : positive integer, equal to or greater than 1. The transfer of these forces and.. moments from the rotating axes to the fixed axes takes place without frequency change (oscillation and torsion effect in the structure);
- the forces (due to the drag movements of the blades) and the moments (due to the flapping movements of the blades) whose axes are in the plane of the rotor, are transmitted to the mast and to the fuselage only if their frequency is of the form $(kb\pm 1)\Omega$, the resulting forces and moments then being at the frequency $kb\Omega$ in fixed axes (roll and pitch effects, transverse or longitudinal sway, principally in $b\Omega$).

Consequently, note that a balanced rotor transmits, over and above the static forces and moments, only alternate forces and moments at a frequency which is a multiple of the speed of the rotor multiplied by the number of blades, the fundamental frequency being equal to $b\Omega$.

It would thus be appropriate, in order to avoid dangerous periodic forces at a frequency which is a multiple of the speed of the rotor, to increase the number of blades since:

the excitation harmonics at the site of the blades which affect the vibrations in the fuselage are distributed according to the order below:

| | | | | | | | | | | | |
|---|---|---|---|---|---|---|---|---|---|---|---|
| two-blade | 1 | 2 | 3 | 4 | 5 | 6 | 7 | 8 | 9 | 10 | 11 |
| three-blade | | 2 | 3 | 4 | 5 | 6 | 7 | 8 | 9 | 10 | 11 |
| four-blade | | | 3 | 4 | 5 | | 7 | 8 | 9 | | 11 |
| five-blade | | | | 4 | 5 | 6 | | | 9 | 10 | 11 |

- the higher the order of the harmonics, the smaller their amplitude;
- the excitations which affect comfort are the harmonics $(kb\pm 1)\Omega$ in the axes of the blades found, after composition, at frequencies $kb\Omega$ in the fuselage of the helicopter;
- the lower the excitation frequency, the greater the extent to which people are sensitive to it, especially along the vertical axis.

For reasons cost and of complexity, it is nevertheless appropriate to limit the number of blades.

Moreover, it is well known that as performance rises, the excitations increase as $V^n$ (n>1): at high speed, the vibratory level in the fuselage grows in the same way.

These comments, together with evidence for ever more important comfort imperatives, are the justification for devising systems capable of transmitting the static forces and moments designated by $F_0$ while attenuating the vibrations, which correspond to the decomposition into a Fourier series $\Sigma Fn \cos n\Omega t$ (t: time, n: order of the harmonics). This attenuation must especially tend to minimize the vertical components of the dynamic loading at the level of the fuselage, which turn out to be the most troublesome in practice.

The parameters which condition the vibratory levels are accounted for of at the design stage of a rotor so as to minimize the effects thereof: type of hub (rigid or articulated hub) and choice of the number of blades, aerodynamic optimization of the blades in order to reduce the excitations and optimization of the dynamic response of the blades in order to reduce the torque vector (forces and moments) transmitted to the head of the rotor.

When these choices and the compromises that are reached do not yield the theoretical (or experimental) results anticipated for the vibratory levels, complementary means of action are resorted to in order to modify the excitation torque vector applied to the fuselage:

1) at the level of the rotor, with adoption of passive pendular antivibrators (or mass-spring systems arranged on the head of the rotor, for example) or of an active multi-cyclical control. In this latter case, a computer transmits signals to the cyclic pitch control of the blades by means of servocontrols, analyzes the effect produced and optimizes the input so as to have minimal acceleration as output. In other words, the multi-cyclical control is a solution specific to helicopters and based on the modification of the aerodynamic forces applied to the blades (and, consequently, on the modification of the excitation torque vector at the head of the rotor, thus at the exterior of the fuselage) by multicyclical injection of the pitch commands;

2) at the level of the fuselage (designed at the outset with, among other imperatives, that of not having a characteristic vibration mode too close to the main excitation frequencies) by:

local processing, by modifying the shapes of the dynamic responses of the structure (batteries moved, stiffening of elements) or by installing mass-spring resonators (sprung batteries for example), overall processing, by active control of the structure, based on the modification of the excitation torque vector applied to the fuselage (that is to say the distribution of the interior forces) and of the response of the latter (French Patent Nos. 1,506,385 and 2,566,862); or 3) intervention at the site of the interface between the mechanical assemblies of the main rotor and the fuselage in order to filter the transfer of the vibrations of the rotor to the airframe, especially via passive suspensions such as those described, for example, French Patent Nos. 1,507,306, 2,499,505 and 2,629,545.

More precisely, patent French Patent No. 1,506,385 relates to an attenuation method and an electrohydraulic attenuator for an aircraft with rotating wings. The method consists of creating, on the basis of the dynamic accelerations measured on the fuselage, electrical signals converted into variations in hydraulic pressure by means of an electrohydraulic servo valve, which pressure variations are transmitted to a double-acting jack arranged between the fuselage and the main transmission gearbox, in such a way as to oppose the vibrations. In order to do this, an accelerometer situated in the fuselage of the aircraft is linked to the control circuit of the double-acting jack. The jack constitutes a fourth linking bar, or, as an alternative, one of the usual bars which comprises, in this case, an elastic member in parallel which provides the flexibility necessary for the correct operation of the device while being able to take up the (substantially static) lift and maneuver forces.

A development of this concept is described in French Patent No. 2,566,862, in which, between the fuselage and the rotor of a helicopter, a plurality of actuators are provided whose oscillations are controlled in phase and in amplitude by virtue of the processing of signals which are representative of the dynamic accelerations, measured by a plurality of accelerometers arranged on the fuselage. Such a system operates in a closed loop. On the basis of the accelerometric measurements on the fuselage, the optimum commands to be generated are obtained with the use of a computer. The effective application of these commands modifies the condition of the fuselage and thus the subsequent measurements.

However, such accelerometric measurements are likely to be affected by errors and uncertainties, due especially to possible phase offsets, by the very fact that they are carried out on the fuselage of the aircraft.

BROAD DESCRIPTION OF THE INVENTION

The object of the present invention is to avoid this drawback.

To this end, the method for filtering the vibratory tory excitations transmitted between two parts, linked by at least one linking element which comprises a transmission member for the static force between said parts, and an actuator associated with said transmission member, in which method:

a physical quantity which is representative of the vibratory excitations transmitted from one part to the other is measured, and corresponding first signals are generated, and said first signals are processed in order to convert them into second control signals for said actuator, which is controlled in order to oppose said vibratory excitations, is noteworthy, according to the invention, in that said physical quantity is measured on said linking element.

Hence, carrying out the measurement of said physical quantity directly on the linking element makes it possible to get round errors or uncertainties linked to measurements carried out on one of the parts in question, especially the fuselage of a helicopter.

Advantageously, as the physical quantity, the axial deformation of said linking element is measured.

Preferably, in the case where a plurality of linking elements link said parts, said physical quantity is measured on each of said linking elements.

According to another characteristic of the invention, during the processing of said first signals, the harmonic component or components of the vibratory excitations which the respective actuator has to oppose is/are identified in each linking element.

In particular, for said identification, it is possible to carry out either a time analysis in real time, by digital or analog bandpass filtering, or a Fourier analysis.

Moreover, said second control signals for the various actuators can be generated either independently or dependently.

According to another characteristic of the invention, in the case where additional passive links are provided between said parts, preferably:

said physical quantity is moreover measured on one or more of the additional passive links; and the dependent control signals for each of said actuators are derived by applying an automatic and continuous minimization of the performance criterion PI of formula:

$$PI = \sum_{k=1}^{p} \left[ \sum_{i=1}^{N+M} a_{ii}(\epsilon_{kf})_i^2 + \sum_{(i \neq j)=1}^{N+M} a_{ij}(\epsilon_{kf})_i(\epsilon_{kf})_j \right]$$

in which:

N = number of actuators and corresponding measurements,

M = number of measurements on the additional passive link or links, $\epsilon_{kf}$ = harmonic component of rank k of said physical quantity of fundamental frequency f, p = number of harmonic components to be filtered, $|a|$ = weighting matrix for the effect of each linking element.

The present invention also relates to an elastic linking device between two parts which transmits, from one to the other, the static forces in the axis of the device, and simultaneously filters the associated coaxial vibratory excitations which are transmitted from one to the other, comprised of:

- at least one linking element between said parts which comprises a transmission member for the static force between said parts and an actuator associated with said transmission member;
- at least one means of measurement of a physical quantity which is representative of the vibratory excitations transmitted from one part to the other, and able to supply corresponding first signals; and
- electronic processing means for said first signals in order to convert them into second control signals for said actuator, which is controlled in order to oppose said vibratory excitations.

Said device being noteworthy in that said measurement means is mounted on said linking element.

In the case where the device comprises a plurality of said linking elements between said parts and a plurality of said measurement means, a measurement means is, advantageously, mounted on each of said linking elements.

Preferably, each measurement means is a sensor which measures the axial deformation of the respective linking element, especially an extensometric gauge.

Moreover, said actuator may be a double-acting jack mounted in parallel on said linking member, and controlled by means of a solenoid valve.

Advantageously, said electronic processing means comprise analysis means for identifying, in each linking element, the harmonic component or components of the vibratory excitations which the respective actuator has to oppose. In particular, said analysis means may carry out a time analysis in real time by digital or analogue bandpass filtering, or a Fourier analysis.

Moreover, the device in which additional passive links are provided between said parts is noteworthy in that, preferably, additional measurement means for said physical quantity are moreover mounted on said additional passive link or links and the dependent control signals for each of said actuators are derived by applying an automatic and continuous minimization of the performance criterion PI of formula:

$$PI = \sum_{k=1}^{p} \left[ \sum_{i=1}^{N+M} a_i(\epsilon_{kf})_i^2 + \sum_{(i \neq j)=1}^{N+M} a_{ij}(\epsilon_{kf})_i(\epsilon_{kf})_j \right]$$

which:

N = number of actuators and corresponding measurements,

M = number of measurements on the additional passive link or links, $\epsilon_{kf}$ = harmonic component or rank k of said physical quantity of fundamental frequency f, p = number of harmonic components to be filtered, $|a|$ = weighting matrix for the effect of each linking element.

The figures of the attached drawing will clarify how the invention can be produced.

DETAILED DESCRIPTION OF THE INVENTION

Figure 1:
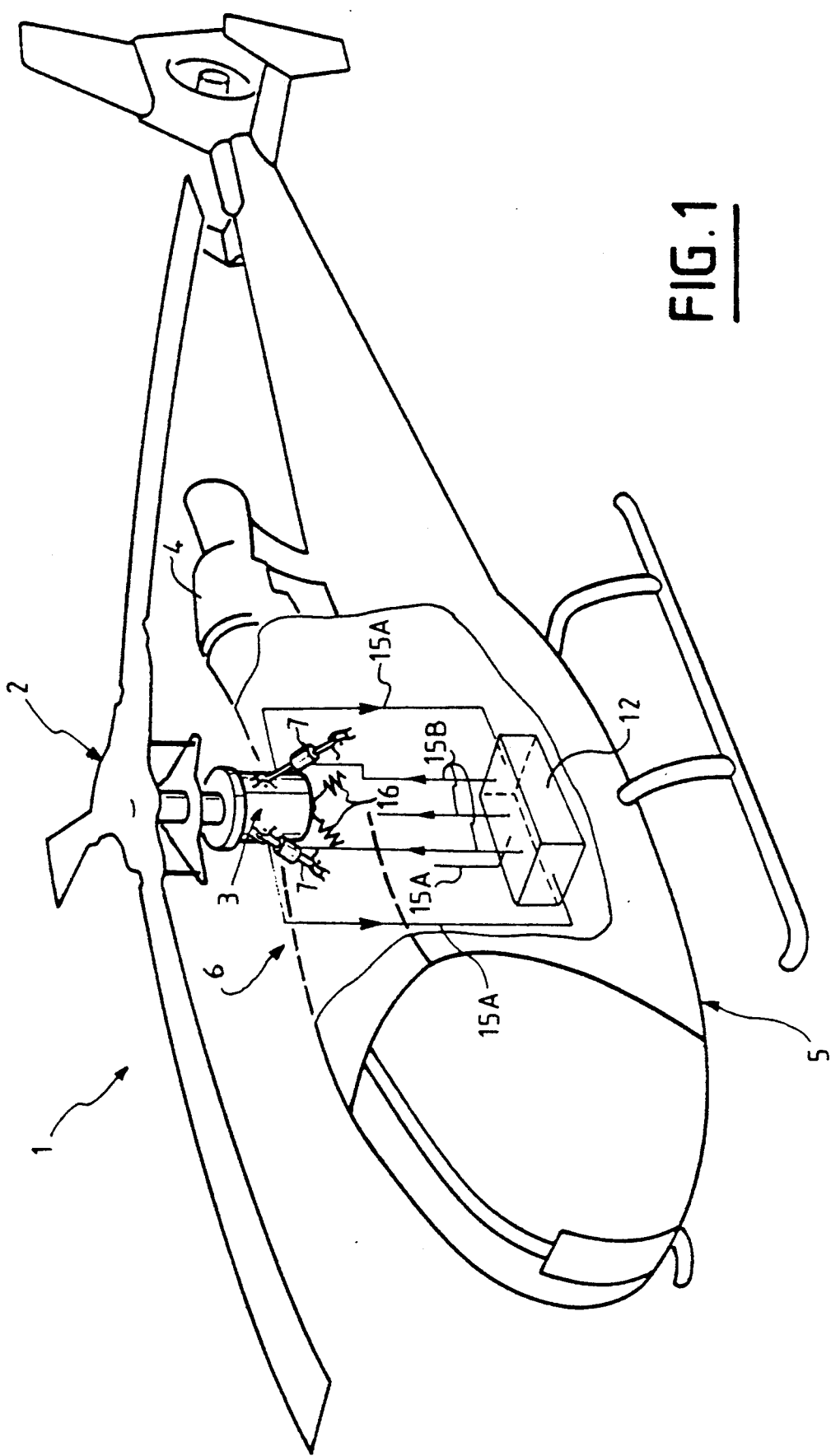
FIG. 1 is a schematic view in perspective of a helicopter which incorporates the elastic linking device according to the invention.

As seen in FIG. 1, the helicopter 1 comprises a main lift rotor 2 driven by a main transmission gearbox 3 for the motive power provided by the engine 4, the gearbox supporting the fuselage 5.

Figure 2:
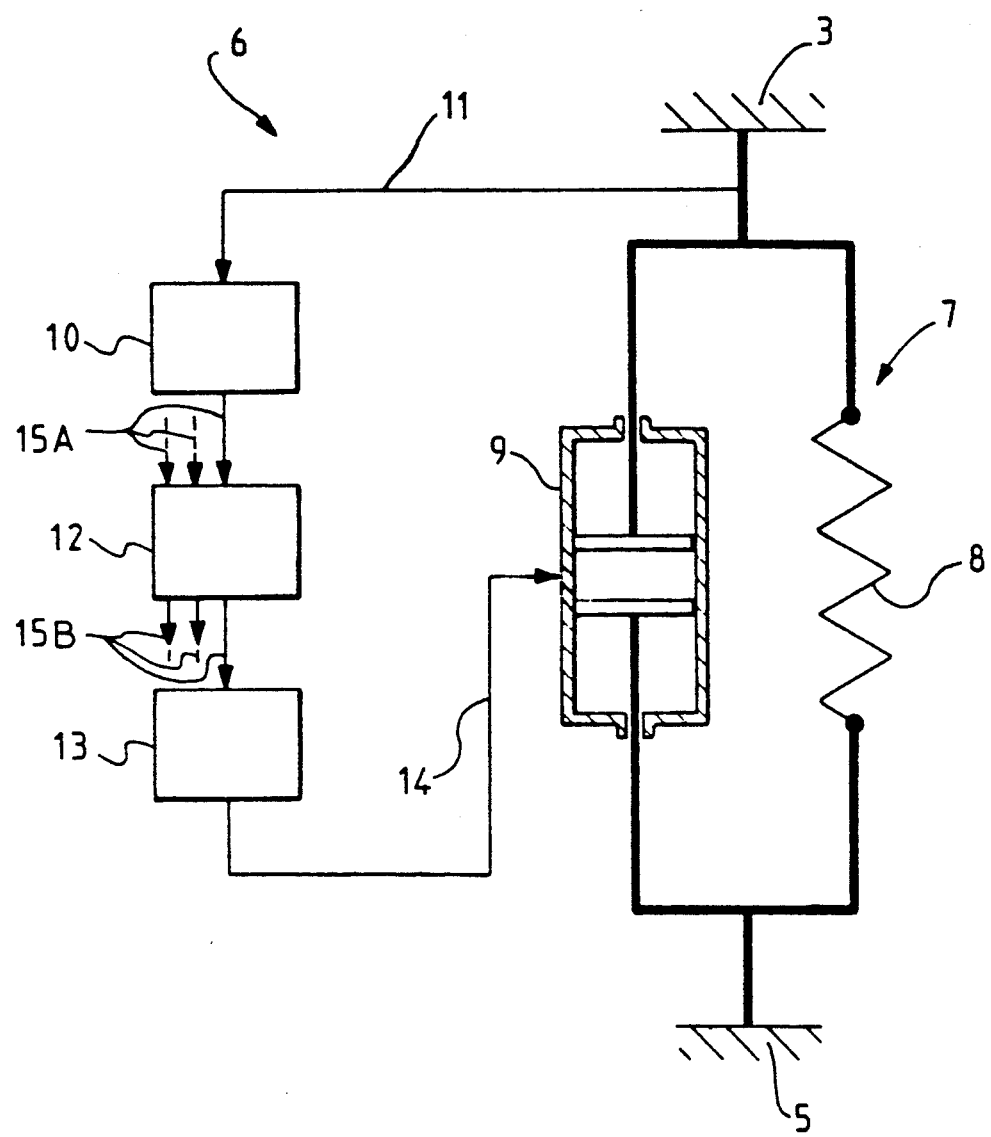
FIG. 2 schematically illustrates an elastic linking device according to the invention.

Between the main transmission gearbox 3 and the fuselage 5 an elastic linking device 6 is provided, which comprises a plurality of linking elements 7 (whose number is equal to three at least), linked, on the one hand, to the main transmission gearbox 3 and, on the, other hand, to the fuselage 4 and each which comprises, as shown in FIG. 2, a transmission member 8 for the static force between the main transmission gearbox 3 and the fuselage 5 (with stiffness adapted to optimal operation of the device), and an actuator 9 associated in parallel with the transmission member 8, and which may be, as illustrated, a double-acting jack which could generally be as described in FR-1,506,385. A sensor 10 which is mounted on each linking element 7, by being integrated or linked in any appropriate way to the latter (as is illustrated very schematically in FIG. 2 by the link 11), makes it possible to measure a physical quantity which is representative of the vibratory excitations transmitted from the main transmission gearbox 3 to the fuselage 5. Such a sensor, which may be an extensometric gauge measuring the axial deformation of the respective linking element (especially the transmission member 8 for the static force), supplies first electrical signals (via the link 15A) to a computer 12 which converts said first signals into second control signals for the actuator 9 (link 15B), controlled by means of the solenoid valve 13 (link 14), in order to oppose the vibratory excitations (the source of power for the actuator is not represented).

These second control signals may be generated independently or dependently, according to whether or not the control of a given actuator is dependent on the control of the other actuators. Moreover, the computer 12 may be common to all the linking elements 7, as is shown symbolically by the additional inputs 15A and outputs 15B of the computer 12 in FIGS. 1 and 2.

As explained in more detail below, the computer 12 comprises analysis means for identifying, in each linking element 7, the harmonic component or components of the vibratory excitations which the respective actuator 9 has to oppose, by carrying out either a time analysis in real time, by digital or analogue bandpass filtering, or a Fourier analysis.

The device of the invention therefore uses modules 7 which are constituted by the parallel association, on the one hand, of a member 8 with optimum passive stiffness for transmitting the static forces (lift of the aircraft) or quasistatic forces (slow maneuvers) and, on the other hand, of an actuator 9, driven in force, in order to minimize, or even cancel out, the excitation harmonics at frequencies $kb\Omega$ ($k$=integer$\geq 1$; $b$=number of blades; $\Omega$=speed of rotation of the rotor in revolutions per second, frequencies in Hz) transmitted from the head of the rotor to the fuselage.

It is obvious that, in order to filter all the harmonics (multiples of the rotor rotation speed multiplied by the number of blades), the command x must be of the type:

$$x = \sum_{k=1}^{y} x_{kb\Omega}$$

it being understood that the fundamental excitation and the associated command correspond to $k=1$, and that $y$ is an integer tending to $\infty$.

Hence it will be observed that, in the present invention, the closed loop is, as it were, localized in each module, while possibly taking account of the operation of the other active modules and, possibly, other passive links, as will be seen in detail below. As already indicated, this makes it possible to avoid the errors and uncertainties linked to measurements carried out on the fuselage of the aircraft.

As already mentioned, each sensor 10 may be constituted by an extensometric gauge on each active module 7 and, possibly, at the site of the interface between any additional passive linking element 16 (FIG. 1) and the fuselage 5, for detecting the relative deformations of the materials which are statically and dynamically loaded. The corresponding electrical signal is then processed by the computer 12 in order to control each actuator 9. Consequently, a relative deformation $\epsilon = \Delta l/l$ is detected, whose harmonic components $\epsilon_{kb\Omega}$[or $\epsilon_{kf}$ where f (fundamental frequency of the excitation) $=b\Omega$ ]are sought, which are representative of the harmonic components of rank k of the dynamic excitation force at the frequency $b\Omega$ to be filtered in whole or in part by each of the actuators.

Two techniques can be envisaged for deducing the components $\epsilon_{kf}$ of the overall measurement $\epsilon = \epsilon_{(t)}$; with t=time.

1) The Fourier analysis which consists of developing the time function $\epsilon$, which is periodic and with angular frequency $\omega$ with $\omega = 2\pi b\Omega$ into a series of sinusoids of angular frequency $k\omega$ ($1 \leq k \leq y$) and of phase angle $\phi_k$, i.e.:

$$\epsilon_{(t)} = \epsilon_0 + \epsilon_{1f}\sin(\omega t + \phi_1) + ... + \epsilon_{kf}\sin(k\omega t + \phi_k) +$$

then in analytically determining the quantities $\epsilon_{kf}$ and $\phi_k$ ($k=1$ to y), and in adopting, for example, only "p" values of k.

The application of this method can be envisaged only if the commands are dependent, that is to say if the command for each actuator takes account of the effects of the other actuators or even of the set of measurements (according, for example, to the performance criteria proposed below). In the opposite case, the convergence of the calculation algorithms for each module is too slow, or even impossible, with respect to the actions of the other modules and, consequently, with respect to the change in the vibratory level to be controlled.

2) Time analysis which consists of filtering, by digital or analogue means with a bandpass filter and a short sampling time, the harmonic components of $\epsilon_{(t)}$ which it is appropriate to attenuate, not to say cancel out. A real-time computer (that is to say with short calculating time with respect to the preponderant time constant of the system) then derives, in real time, the electrical signals to be transmitted to the actuator. Considering these characteristics, this method applies in every case.

In the case of a single actuator controlled on the basis of the measurement of the deformation of the linking element with which it is linked or integrated, the dynamic force may be simply cancelled out. An identical result is obtained in the case of a plurality of actuators whose commands are independent and derived, for each of them, from the force exerted on the transmission support platform. The same may be even be true when the commands are dependent, as it can be demonstrated that, if a structure is controlled by N actuators, it is possible to cancel out N chosen measurements and, consequently, those relating to the dynamic elongations of the linking elements equipped with an actuator. This is an ideal theoretical solution in the absence of any passive link.

However, if the fuselage is sensitive to the excitations transmitted by the passive links arranged, for example, at the bottom of the main transmission gearbox (longitudinal or transverse sway movements, for example), the device as described above may prove to be insufficient.

In order to avoid this drawback, the first solution consists of in replacing the links between transmission gearbox bottom and fuselage by active isolator elements which are constituted by modules identical to those previously described.

Figure 3:
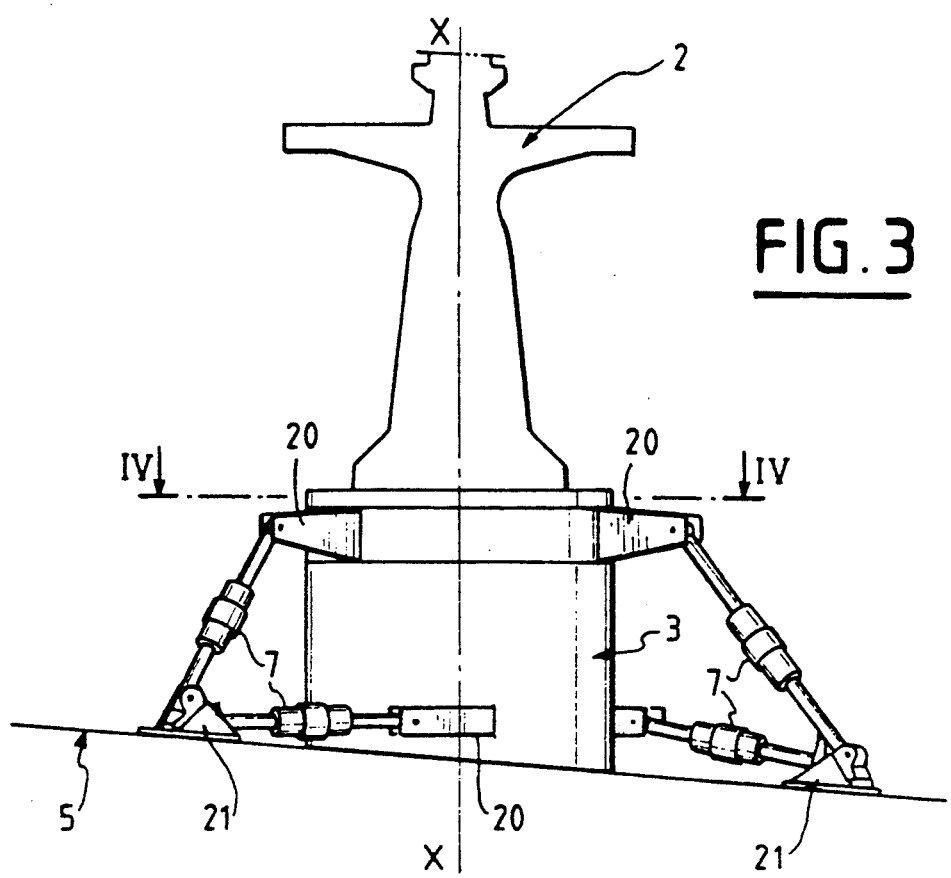
FIG. 3 shows an example of arrangement of the linking elements of the device of the invention between the main transmission gearbox and the fuselage of a helicopter.
Figure 4:
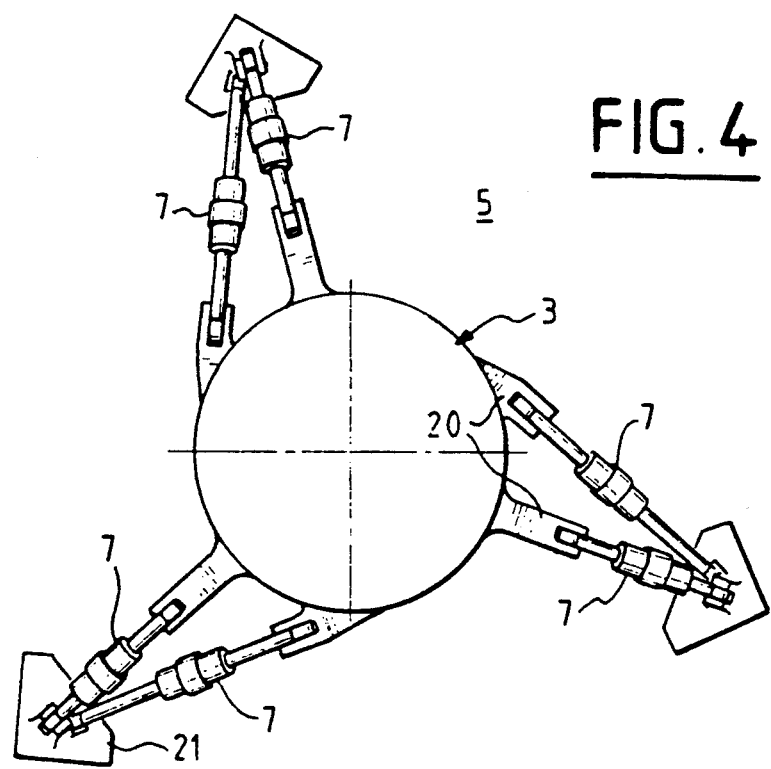
FIG. 4 is the section along line IV—IV of FIG. 3.

As the movement of a rigid body is described by three displacements and three rotations, there are six degrees of freedom to be actively controlled. Hence, the minimal solution, which makes it possible to theoretically eliminate all transfer of dynamic excitations from the rotor to the fuselage, consists of providing for the installation of six active modules according to the invention, in accordance with the embodiment example illustrated by FIGS. 3 and 4. This is, once again, a theoretically ideal configuration.

As can be seen in these figures, three linking elements 7 are arranged between the upper part of the main transmission gearbox 3 and the upper structure of the fuselage 5 along the edges of a trihedron whose peak is situated on the axis X—X of the main lift rotor 2, and three other linking elements 7 are arranged between the substantially circular bottom of the main transmission gearbox 3 and the upper fuselage structure 5, tangentially to the bottom of the main transmission gearbox and equidistant from each other. The linking elements 7 are fixed to the main transmission gearbox 3 and to the fuselage 5 by means of conventional clevises 20, 21.

With the assumption that the links 16 between the main transmission gearbox bottom and the fuselage remain passive, a second solution amounts to taking account of the measurement of the deformations introduced, in the fuselage, by these links. For example, if N active modules are available, linked to N deformation measurements, and P passive links 16 (for example three in number) are available, linked to M measurements, the dependent commands for the N modules can be optimized by applying, for example, the quadratic criterion according to PI, or performance criterion, to be minimized in order to establish the optimum commands to be generated:

$$PI = \sum_{k=1}^{p} \left[ \sum_{i=1}^{N+M} a_i(\epsilon_{kf})_i^2 + \sum_{(i\neq j)=1}^{N+M} a_{ij}(\epsilon_{kf})_i(\epsilon_{kf})_j \right]$$

in which $\epsilon_{kf}$ designates the harmonic component of rank k, f being the fundamental frequency b$\Omega$, p designates the number of harmonics which it is desired to attenuate, and $|a|$ a weighting matrix which modulates the commands to the various N actuators, thereby permitting optimal adjustment of the suspension. The dynamic forces are then non-zero in the links between the main transmission gearbox and the fuselage.

More precisely, this performance criterion is equivalent to:

$$PI = \epsilon^H a \, \epsilon$$

where $\epsilon$ is the vector of the measured relative deformation, $\epsilon^H$ the conjugate transposed matrix deduced from $\epsilon$, and $|a|$ the weighting matrix associated with the measurements.

It will be noted that, having regard to the degrees of freedom of the passive links 16, the number of measurements M may be different from the number P of passive links. If the measurements M relate to the displacements, for example, of the P passive links at the level of the fuselage, it turns out that, for each link P, there are three possible measurements, i.e. $M = 3 \times P$, and, for that reason, as many sensors may be provided as there are measurements to be carried out.

We claim:

1. A method for filtering the vibratory excitations transmitted between two parts (3,5), linked by at least one linking element (7) comprising a member (8) for transmission of the static force between said parts (3,5), and an actuator (9) associated with said transmission member (8), comprising:
   generating a physical quantity which is representative of the vibratory excitations transmitted from one part to the other part is measured on said linking element (7), and corresponding first signals are generated;
   processing said first signals by processing means (12), in order to convert said first signals into second control signals for said actuator (9); and
   carrying out the decoupling of the static force and of the vibratory excitations by said processing means (12), in such a way that said second control signals drive the actuator in order to exactly oppose said vibratory excitations.

2. The method as claimed in claim 1 wherein, as a physical quantity, the axial deformation of said linking element (7) is measured.

3. The method as claimed in claim 1, in the case where a plurality of linking elements (7) link said parts (3,5), wherein said physical quantity is measured on each of said linking elements (7).

4. The method as claimed in claim 1 wherein, during the processing of said first signals, the harmonic components of the vibratory excitations which the respective actuator (9) has to oppose are identified in each linking element (7).

5. The method as claimed in claim 4 wherein, for said identification, a time analysis is carried out in real time, for said identification, by digital or analogue bandpass filtering.

6. The method as claimed in claim 4, wherein, for said identification, a Fourier analysis is carried out.

7. The method as claimed in claim 3 wherein said second control signals for the various actuators (9) are generated independently.

8. The method as claimed in claim 3 wherein said second control signals for the various actuators (9) are generated dependently.

9. The method as claimed in claim 3 wherein, the case where additional passive links (16) are provided between said parts (3,5):
   said physical quantity is moreover measured on each of the additional passive links (16); and
   the dependent control signals for each of said actuators (9) are derived by applying an automatic and continuous minimization of the performance criterion PI of formula:

$$PI = \sum_{n=1}^{p} \left[ \sum_{i=1}^{N+M} a_i(\epsilon_{kf})_i^2 + \sum_{(i\neq j)=1}^{N+M} a_{ij}(\epsilon_{kf})_i(\epsilon_{kf})_j \right]$$

in which:
   N = number of actuators and corresponding measurements,
   M = number of measurements on the additional passive links,
   $\epsilon_{kf}$ = harmonic component of said physical quantity,
   p = number of harmonic components to be filtered,
   $|a|$ = weighting matrix for the effect of each linking element.

10. An elastic linking device between two parts (3,5) for transmitting, from one part to the other part, the static forces in the axis of the device and simultaneously filtering the associated coaxial vibratory excitation which are transmitted from one part to the other part, said device comprising:
   at least one linking element (7) between said parts (3,5) comprising a transmission member (8) for the static force between said parts (3,5), and an actuator (9) associated with said transmission member (8);
   at least one means of measurement (10) of a physical quantity which is representative of the vibratory excitations transmitted from one part to the other part, said measurement means being able to supply corresponding first signals, said measurement means (10) being mounted on said linking element (7); and
   electronic processing means (12) for processing said first signals in order to convert them into second control signals for said actuator (9), said processing means (12) decoupling the static force and the vibratory excitations, in such a way that said second control signals drive the actuator in order to exactly oppose said vibratory excitations.

11. The device as claimed in claim 10 comprising a plurality of said linking elements (7) between said parts (3,5) and a plurality of said measurement means (10), wherein a measurement means (10) is mounted on each of said linking elements (7).

12. The device as claimed in claim 10 wherein each measurement means is a sensor (10) measuring the axial deformation of the respective linking element (7).

13. The device as claimed in claim 12 wherein said sensor (10) is an extensometric gauge.

14. The device as claimed in claim 10 wherein said actuator is a double-acting jack (9) mounted in parallel on said linking member (8), and controlled by means of a solenoid valve (14).

15. The device as claimed in claim 10 wherein said electronic processing means (12) comprises analysis means for identifying, in each linking element (7), the harmonic component or components of the vibratory excitations which the respective actuator (9) has to oppose.

16. The method as claimed in claim 15 wherein said analysis means carries out a time analysis in real time, by digital or analogue bandpass filtering.

17. The method as claimed in claim 15 wherein said analysis means carry out a Fourier analysis.

18. The device as claimed in claim 10 wherein, in which additional passive links (16) are provided between said parts (3,5), additional measurement means for said physical quantity is mounted on said additional passive links (16) and wherein the dependent control signals for each of said actuators (9) are derived by applying an automatic and continuous minimization of the performance criterion PI of formula:

$$PI = \sum_{n=1}^{p} \left[ \sum_{i=1}^{N+M} a_{ii}(\epsilon_{kf})_i^2 + \sum_{(i \neq j)=1}^{N+M} a_{ij}(\epsilon_{kf})_i(\epsilon_{kf})_j \right]$$

in which:
N = number of actuators and corresponding measurements,
M = number of measurements on the additional passive links,
$\epsilon_{kf}$ = harmonic component of said physical quantity,
p = number of harmonic components to be filtered,
|a| = weighting matrix for the effect of each linking element.

19. An aircraft with rotating wings, especially a helicopter, comprising a main lift rotor (2) driven by a main transmission gearbox (3) for the motive power, which gearbox supports a fuselage (5), said aircraft comprising:

an elastic linking device between said transmission gearbox (3) and said fuselage (5) for transmitting, from said transmission gearbox (3) to the fuselage (5), the static forces in the axis of the device and simultaneously filtering the associated coaxial vibratory excitations which are transmitted from the transmission gearbox (3) to the fuselage, said device comprising; at least one linking element (7) between the transmission box (3) and the fuselage (5) comprising a transmission member (8) for the static force between said transmission box (3) and said fuselage (5) and an actuator (9) associated with the transmission member (8);

at least one means of measurement (10) of a physical quantity which is representative of the vibratory excitations transmitted from the transmission box (3) to the fuselage (5), said measurement means able to supply corresponding first signals, the measurement means (10) being mounted on said linking element (7) and electronic processing means (12) for processing said first signals in order to convert them into second control signals for said actuator (9), said processing means (12) decoupling the static force and the vibratory excitations, in such a way that said second control signal drive the actuator in order to exactly oppose said vibratory excitations.

20. The aircraft with rotating wings as claimed in claim 19 comprising at least three said linking elements (7) arranged between the upper part of said main transmission gearbox (3) and the upper structure of said fuselage (5) along the edges of a trihedron whose peak is situated on the longitudinal axis (X—X) of the main lift rotor(2).

21. The aircraft with rotating wings as claimed in claim 20 wherein at least three other linking elements (7) are arranged between the bottom of said main transmission gearbox (3) and the upper structure of said fuselage (5), tangentially and equidistantly to the bottom of said main transmission gearbox (3).

* * * * *